Oct. 17, 1961     F. TIKAL     3,004,799
METHOD AND DEVICE FOR CONVEYING DRY POWDERED
MATERIAL THROUGH A CONDUIT
Filed May 21, 1957
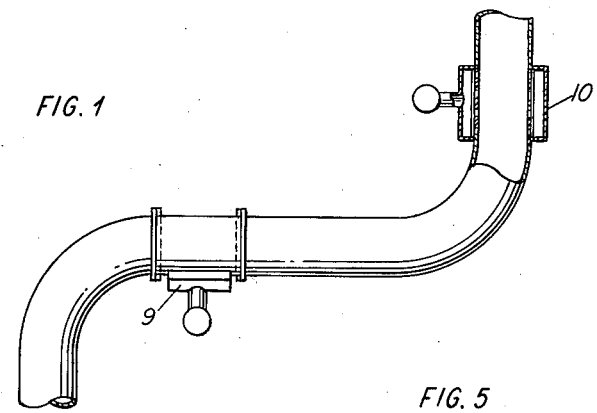
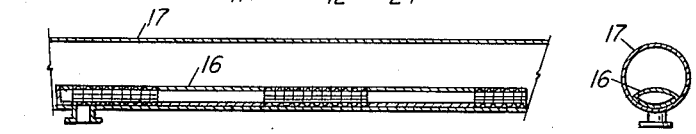
INVENTOR
FRANTIŠEK TIKAL 3,004,799
METHOD AND DEVICE FOR CONVEYING DRY POWDERED MATERIAL THROUGH A CONDUIT
František Tikal, 26 Ovalova, Prague, Czechoslovakia
Filed May 21, 1957, Ser. No. 660,684
Claims priority, application Czechoslovakia June 25, 1956
9 Claims. (Cl. 302—50)

The present invention relates to a method and device for conveying dry powdered material in bulk, for example, cement, flour and similar materials, through a pipe line or enclosed aerated troughs in any desired direction, that is, horizontally, vertically or at any angles therebetween.

The hitherto known methods of transporting pulverized material through a pipe line are disadvantageous because of the great consumption of compressed air by means of which the material is made turbulent and conveyed through the pipe line. This requires a considerable amount of energy, apart from the high initial cost of the apparatus that is required.

The up-to-date pneumatic systems, sometimes called chamber-pumps, are adapted to loosen the conveyed material by aeration, but in this case the air has a tendency to escape from the material, this fact being a source of difficulties in particular when the transport of material is interrupted. High transportation speeds of 50 to 80 feet/sec. are the cause of rapid wear of the pipe line, in particular at its bends as a result of the abrasive effect thereon of the hard material being transported.

When the material is pneumatically transported through a pipe line after being supplied to the latter by a screw feeder, for instance, a worm, about 29 m.³ of air are required for one ton of material. When chamber pumps are used, the consumption of air is about 20 m.³/ton and for smaller distances up to 10 m.³/ton. The pressure of air amounts to 4–1.5 atm. according to the distance. The worm feeders operate continuously but, require a considerable supply of energy, because they must compress the material so as to produce a plug in the pipe line which seals against the air pressure. The resistance of the material is thus increased considerably, causing a higher consumption of energy.

The previously known air troughs convey aerated bulk material along the trough which slopes or inclines slightly towards the discharge orifice. The latest air troughs make possible transport even in an upwardly inclined direction by subjecting the material to the air pressure from the chamber pump. The initial as well as the operational cost of such devices are high, and such devices have the additional disadvantage of being of considerable height. They require great quantities of air and therefore also large compressors, apart from operating intermittently.

The transport of pulverized bulk material according to the present invention removes the above mentioned disadvantages by providing a pump operating in a way similar to the pumping of liquids, thereby avoiding the need for large compressors.

The present invention relates to a new device for the transport of bulk material through a pipe line or closed aeration troughs in any desired direction, that is, horizontally, vertically or in any direction therebetween.

According to the main feature of the invention the pressure difference by which the material is conveyed is produced by a mechanical pump, while the conveyed material is maintained in a loosened condition, similar to that of a liquid, by dispersing or distributing air or other gas in the material through porous walls of the pump or of aeration members inserted in all main parts of the pump or only in some of them.

The bulk material is maintained, both in the mechanical pump and in the conduit under all circumstances, in a loosened and aerated state, with the degree of loosening being controllable. The material is thus maintained in a condition similar to a liquid, offering the small resistance to flow which is characteristics of a liquid. Thus, the material can be conveyed in any direction by a small pressure difference developed by the mechanical pump and sufficient to overcome the hydrostatic pressure and flow resistances. Since the overpressure acting upon the material is produced by a mechanical pump, the flow velocity can be maintained within limits common in connection with the pumping of liquids, so that the abrasive effect of the conveyed material is negligible.

When a relatively long conduit is used, the required loosened condition of the material is maintained by aerating boxes spaced apart along the conduit or by providing parts of the conduit with a porous wall. Alternatively, a conduit of a smaller diameter may be inserted into the conveying conduit, such smaller conduit having a wall which is porous along its entire length or only at spaced apart locations and through which finely dispersed air or gas is introduced into the material to maintain the latter in a liquid-like or fluidized condition.

When a longer conduit is used the amount of the loosening air in the conveyed material may be controlled by the same aerating members in such a way that excessive air, which could interfere with the operation, is removed from the material.

In the existing pneumatic conveyors having screw feeders, the latter serve only for introducing the material into a mixing chamber where the material is set into turbulent motion by injected pressure air which serves also to convey the material in the desired direction. As distinguished from the foregoing, when the bulk material is conveyed according to the present invention the mechanical pump performs the pumping operation itself and the introduced air merely loosens or fluidizes the bulk material to reduce its resistance to flow.

The pump according to the invention operates with pulverized bulk material, which is permanently in a loosened or liquified condition, thereby offering a small resistance to the pumping action. The state or degree of loosening is controlled by aeration boxes or by other aeration members, such as, for example, tubes, troughs or porous walls in the hopper or, if required, for example, in the casing of the pumping screw and in the discharge chamber. The aeration devices themselves have common or independent inlets for air or gas, and, if required, may be provided with means for adjusting the individual air or gas pressures.

In the accompanying drawing which shows, by way of example, several embodiments of the invention:

FIG. 1 is a sectional view of a device embodying the invention and in which a screw pump is used, FIG. 2 is a longitudinal section of a part of a conveying conduit with an aeration tube inserted therein, FIG. 3 is a cross sectional view of the conduit of FIG. 2, FIG. 4 is a view similar to that of FIG. 1, but showing an embodiment of the invention in which the compressed air or gas is admitted through a hollow shaft of the screw pump, and FIG. 5 is a detail view of a portion of a screw pump having a helix with a porous wall.

Referring to FIG. 1, it will be seen that a device embodying this invention has a screw pump for the bulk material which comprises a conveying impeller in the form of a worm 1 mounted for rotation in a casing 2. The casing is attached at one end to a hopper 3 which has an aeration box 4 at the bottom thereof. At the other end of the casing 2 there is provided a discharge chamber 5 with an aerating box 6.

The conveying worm 1 is mounted in a bearing member 27 provided with a seal 21. Attached to the discharge chamber 5 is a transport conduit 8. The hopper 3 has a porous bottom wall 19 opening into the aeration box 4, and the discharge chamber 5 has a porous wall 20 opening into the aeration box 6. Air under pressure is admitted to the aerating boxes or chambers 4 and 6 through valves 12 and 23 from a supply manifold 11, and a valve 24 is provided for admitting air into the seal 21 from the common compressed air conduit or supply manifold 11.

The pulverized material flows in fully or partially aerated condition into the hopper 3, where the fluidity of the material is maintained by aeration through the porous wall 19 under as low a pressure as will provide the degree of loosening that is required so as to avoid a high excess of air, because the latter would then be separated or disengaged from the pulverized material and thereby impair its fluidity. The amount of air and its pressure are adjusted by means of the valve 12, and a pressure gauge (not shown) may be provided for assisting this operation.

The mechanical pumping member producing the transport pressure, which in the present case is a quickly revolving conveying worm 1, behaves similarly to a ship's propeller in water, that is, it bears axially with its helix against the fluidized pulverized material. Because this material is urged by the helix of the conveying worm in the forward direction, a pressure and conveying effect is produced. The loosened material in the hopper 3 is conveyed by the worm 1 along the casing 2 together with the dispersed air. The worm 1 preferably has a progressively diminishing pitch and the pulverized material and the air are thereby compressed with the result that the pressure for effecting the transport of the material is further increased.

In order to obtain efficient compression, it is desirable that the material should not contain too much air. On the other hand, too little air would cause a quick increase of resistance to the rotation of the worm 1. In order to avoid clogging of the worm 1 at the outer or discharge end thereof, where the pulverized material and air are compressed to a considerable degree, particularly during operation with a relatively large discharge head, that is, when conveying the material from a relatively low inlet to a much higher outlet, or during conveying over a very large horizontal distance, it is advantageous to provide the casing 2 at its outer end with a porous wall 13, opening into one or more aerating chambers 14 and 15 which, by way of valves 22 and 25 receive compressed air from manifold 11. The pressure of air in the chambers 14 and 15 is adjusted by means of the valves 22 and 25 so as to maintain the conveyed material in a fluid state with the correspondingly low resistance of the material to the action of the worm 1. The air admitted to casing 2 from the chambers 14 and 15 also serves to free the clogged worm 1, if the pump comes to a standstill owing to a high resistance of the material.

The conveyed material in the discharge chamber 5 is further aerated by air under a higher air pressure admitted through the porous wall 20 in order that the wall 20 which is at an angle to the direction of the flow out of the pump casing 2 will offer a small resistance to the passage through the transport conduit 8. The amount and pressure of the air admitted from manifold 11 into chamber 5 is adjusted by a valve 23 with the help of a pressure gauge (not shown). The conveyed material may also be loosened at locations disposed further along the conduit 8 by providing the conduit 8 with porous wall portions 9 at such locations surrounded by aerating chambers to which compressed air is suitably supplied, but this is not always required, as normally the aeration of the material in the discharge chamber 5 is sufficient to ensure the maintenance of the fluidized condition along the conduit 8. An air chamber 10 communicating with the conduit by porous walls is provided to withdraw air that has been released by the fluidized material.

If the conveying conduit 8 has too great a length, particularly along the parts thereof which are horizontal or inclined from the vertical, separation of the air from the pulverized material, which is caused by irregularities in the flow, cannot always be prevented by aeration at spaced apart locations. It is therefore preferable to insert in each long horizontal or inclined branch of the conveying conduit, for example, in the conduit 17 of FIGS. 2 and 3, an elongated tube 16 having a partially porous wall, through which air admitted at the inlet may be added to the material in tube 17 as required so as to retain, as far as possible, a laminar flow of the material throughout the entire cross-sectional area of the conduit, so that the transport conditions are most favorable.

The air which has already been disengaged from the material, does not, as a rule, again return into the material, and it is therefore preferable to permit the escape of such air through porous walls. Since the disengagement of air from the material disrupts the fluidity of the latter, it is therefore necessary to again disperse air in the material through porous walls of the aerating members, which are adjacent those through which the disengaged air has been withdrawn.

The aerating member, for example, the inserted tube 16 may be formed in various suitable ways to be either fully or partially porous. Thus, the tube may consist of any suitable porous material or may be provided with inserts made of fabric or of a porous ceramic or synthetic material or of a porous cast or sintered metal or of close wire mesh which, if required, may be lined with a porous layer of any known composition.

When separated air is removed from a substantially horizontal part of the conduit or pipe line, the removal is preferably effected at the upper walls of the pipe.

FIGS. 4 and 5 show other embodiments of the present invention, in which the air or gas for fluidizing the material is introduced through the shaft of the pump screw or worm 1'.

The screw pump of FIG. 4 includes a worm 1' on a hollow shaft 28 which is rotatably supported in a bearing member 27 having an air seal 21, and which is disposed within a casing 2'. A hopper 3' opens into the casing 2' at one end of the latter, and the other end of the casing opens into a discharge chamber 5' into which a transport conduit 8' extends. Porous aerating casings 34 and 35 surround the hollow shaft 28 in the hopper 3' and in the discharge chamber 5', respectively, and bores 36, 37 and 38 open radially from the interior of shaft 28 into the casings 34 and 35 and the seal 21. Air under pressure is admitted to hollow shaft 28, as at 29, and is admitted to the pulverized material through the aerating casings 34 and 35 to fluidize the pulverized material.

The screw pump of FIG. 5 is similar to that of FIG. 4, but the hollow shaft 42 carries a worm 40, which, at least in parts, is hollow and provided with porous wall surfaces 41. The hollow shaft 42 is provided with radial bores 43 connecting the cavity of the hollow worm 40 with the axial bore of the shaft 42.

The operation of each of the pumps shown in FIGS. 4 and 5 is similar to that of the pump described with reference to FIG. 1, in that pulverized material, which is partially or entirely aerated when admitted to the hopper 3', has its fluidity maintained by dispersing air into the material through the porous casing 34. The material together with dispersed air is conveyed and compressed by means of the worm 1' or 40, with the result that transport pressure and effect are produced. In the discharge chamber 5' the degree of loosening of the material is further increased by aeration through the aerating casing 35.

The devices according to the invention may be used instead of the existing pneumatic systems using an increased air pressure or suction for conveying bulk material. The invention offers new possibilities for the transport of bulk material in aerated troughs insofar as the material may even be conveyed upwardly.

It is a further important advantage of the invention that instead of relatively costly troughs, tubes may be used, which are cheaper to manufacture and easier to assemble. The invention offers particular advantages for small plants and in devices for unloading wagons and tank vehicles, which may be unloaded by loosening the material by aeration, thereby replacing the more expensive elevators previously used for that purpose.

An important advantage of the invention resides in the fact that a more efficient mechanical pump, operating with a smaller power input than the hitherto known screw feeder is used instead of the relatively expensive compressed air for producing the conveying movements of bulk material. The consumption of air for loosening or fluidizing the material is considerably smaller than the consumption of air in installations where the conveying movement is produced by compressed air and further a lower air pressure is sufficient. The initial, maintenance and operational costs are reduced in this way. The clogging of the pipeline, which is a common occurrence in other systems, may easily be prevented by a suitable adjustment of the air admitted for aeration at the locations along the conduit where passage is endangered.

I claim:

1. A device for transporting dry, pulverized bulk material, comprising a mechanical pump for the bulk material, the pump including an elongated casing having at one end an inlet chamber for receiving the pulverized bulk material to be transported and at the other end a discharge chamber, a worm impeller rotatably mounted in said casing, said impeller having an axial shaft with a helical blade thereon, said device further comprising aerating means having porous wall surfaces opening into said casing, and means supplying a gaseous medium under pressure to said aerating means so that the gaseous medium is dispersed in the pulverized bulk material to fluidize the latter and thereby reduce its resistance to movement through said casing by said impeller, said shaft being hollow to receive said gaseous medium, and said helical blade being hollow to define a aerating chamber in said blade, said porous wall surfaces being disposed at said aerating chamber, and said shaft having radial bores opening into said aerating chamber so that a gaseous medium supplied to the hollow shaft is dispersed in the pulverized bulk material through said porous wall surfaces.

2. A device for transporting dry, finely divided bulk material through a closed conduit, comprising a mechanical pump including a casing having an inlet and a discharge end and being connected to the conduit at said discharge end and at the inlet end of the conduit, means to receive the material at the inlet end of the pump, and impeller means within the casing to propel the material through the pump into the conduit, the device further comprising aerating means to disperse a gaseous medium in the material to be transported, the aerating means being provided to admit the gaseous medium directly to the casing and to ensure aeration of the material and the aerated condition throughout the entire length of the pump, the impeller means providing a sealing condition between the impeller means and the inner wall of the casing and thus compressing the fluidized material to effect transportation through the conduit.

3. In the device according to claim 2, an inlet chamber at the inlet end of the pump, a discharge chamber at the inlet end of the conduit, the aerating means including orifices in the wall of the inlet chamber and in the casing and opening into the inlet chamber and the casing, respectively.

4. In the device according to claim 3, the aerating means including orifices in the wall of, and opening into, the discharge chamber.

5. In the device according to claim 2, a shaft longitudinally extending through the casing, a screw impeller fixed to the shaft, the screw blade providing a sealing condition between the blade and the inner wall of the casing.

6. In the device according to claim 5, wherein said shaft is hollow, and the aerating means include porous sleeve means surrounding the hollow shaft, and apertures radially opening from the hollow shaft into the sleeve means.

7. In the device according to claim 2, wherein said conduit has a substantially horizontal portion, and further comprising means opening from said horizontal portion of the conduit for withdrawing from the latter such gaseous medium as has separated from the material being transported through the conduit.

8. In the device according to claim 2, the aerating means including orifices in the wall of, and opening into, the conduit.

9. In the device according to claim 2, the aerating means including an at least partly porous tube extending within the conduit.

References Cited in the file of this patent

UNITED STATES PATENTS

| | | |
|---|---|---|
| 1,757,832 | Goebels | May 6, 1930 |
| 2,448,745 | Struckmann | Sept. 7, 1948 |
| 2,527,455 | Schemm | Oct. 24, 1950 |
| 2,676,851 | Sylvest | Apr. 27, 1954 |
| 2,693,395 | Berg | Nov. 2, 1954 |
| 2,727,792 | Bearer | Dec. 20, 1955 |
| 2,739,845 | Berg | Mar. 27, 1956 |
| 2,793,914 | Gardeniers | May 28, 1957 |
| 2,805,897 | Yellott | Sept. 10, 1957 |

FOREIGN PATENTS

| | | |
|---|---|---|
| 267,106 | Great Britain | June 23, 1927 |
| 540,521 | Italy | Mar. 10, 1956 |
| 710,306 | Great Britain | June 9, 1954 |
| 765,158 | Great Britain | Jan. 2, 1957 |
| 901,154 | Germany | Jan. 7, 1954 |
| 1,037,530 | France | Apr. 29, 1953 |
| 1,115,327 | France | Dec. 26, 1955 |

OTHER REFERENCES

Moller: German application, Ser. No. M18,176, printed October 20, 1955 (Kl. 81e—Gr. 62).